Oct. 21, 1958  R. W. KEENE  2,856,748
SPRING FINGER UNIT FOR HARVESTER REELS
Filed April 23, 1957
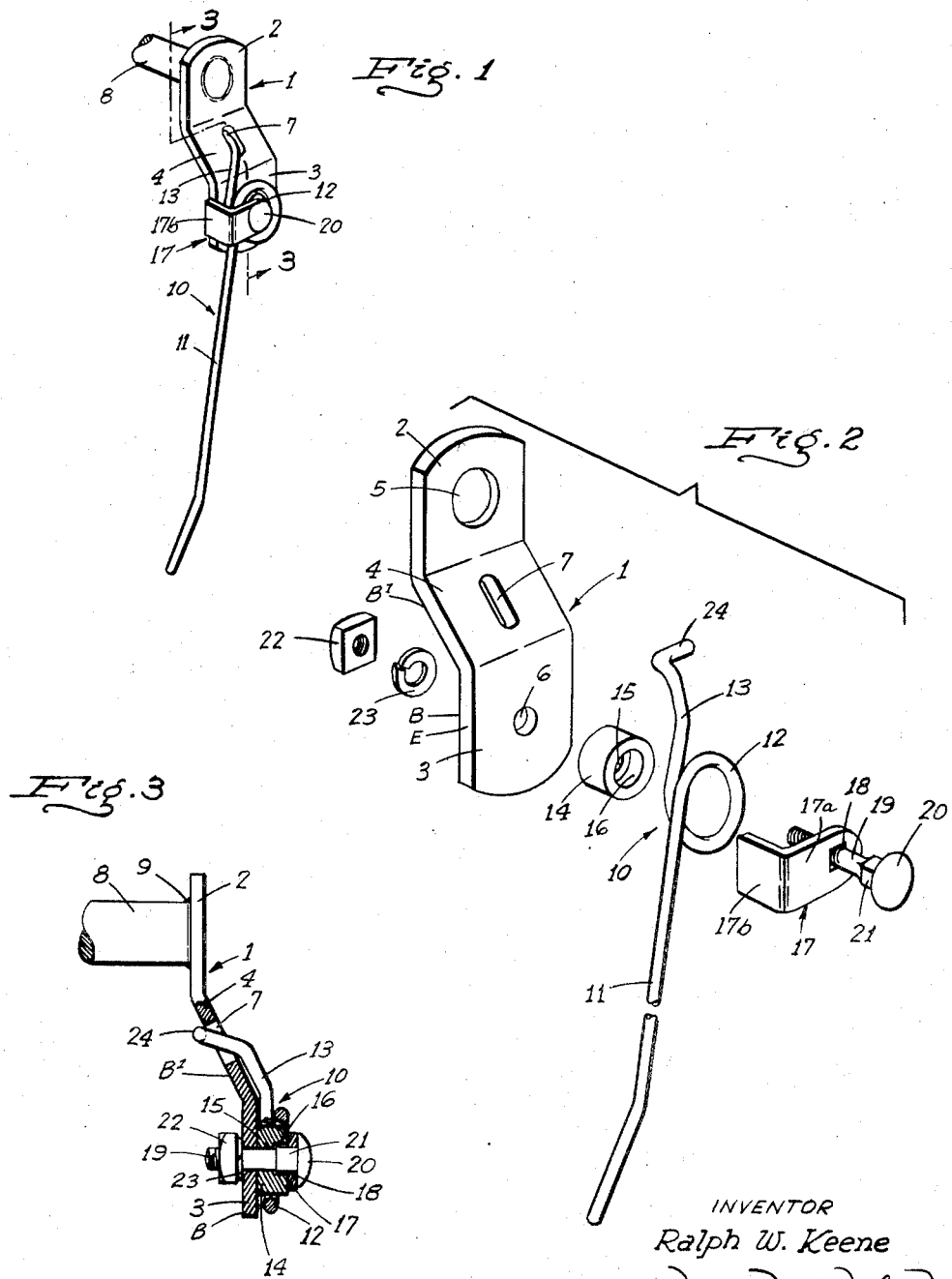
INVENTOR
Ralph W. Keene
BY Webster & Webster
ATTYS.

United States Patent Office 2,856,748
Patented Oct. 21, 1958

2,856,748

SPRING FINGER UNIT FOR HARVESTER REELS

Ralph W. Keene, Stockton, Calif., assignor to Universal Harvester Co., Stockton, Calif., a partnership Application April 23, 1957, Serial No. 654,600

3 Claims. (Cl. 56—400)

This invention is directed to, and it is a major object to provide, a novel spring finger unit for harvester reels; such unit being especially designed—but not limited—for use at the end of—or outboard on—a pick-up type reel.

Another important object of the invention is to provide a spring finger unit, for harvester reels, which includes a spring finger removably secured in quick-detachable relation on a permanent mount, whereby such finger can be readily and conveniently replaced when damaged or broken.

An additional object of the invention is to provide a spring finger unit, for harvester reels, wherein the finger is secured to the permanent mount in a manner which permits of substantial and effective action of such finger with less damage or breakage than might otherwise occur.

A further object of the invention is to provide a spring finger unit, for harvester reels, which is designed for ease and economy of manufacture and installation.

It is also an object of the invention to provide a practical, reliable, and durable spring finger unit for harvester reels.

These objects are accomplished by means of such structure and relative arrangement of parts as will fully appear by a perusal of the following specification and claims.

In the drawings:

Fig. 1 is a perspective view of the spring finger unit as mounted on a shaft.

Fig. 2 is a perspective and exploded view of the spring finger unit.

Fig. 3 is an enlarged transverse sectional elevation taken on line 3—3 of Fig. 1.

Referring now more particularly to the drawings, and to the characters of reference marked thereon, the spring finger unit comprises a mounting plate, indicated generally at 1, and which plate embodies an upwardly projecting tongue 2 and a depending, laterally outwardly offset tongue 3; the tongues 2 and 3 being connected—in integral relation—by a laterally outwardly and downwardly inclined intermediate section 4.

The mounting plate 1 is formed with a relatively large-diameter central bore 5 in the upwardly projecting tongue 2; a relatively smaller central bore 6 in the depending tongue 3; and a vertically elongated central slot 7 in the intermediate section 4.

When the spring finger unit is attached to a harvester reel for use, the mounting plate 1 is permanently affixed—as here shown—to the outer end of a shaft 8 of said reel, as by welding 9; the mounting plate 1 depending from said shaft. However, it will be recognized that the type of shaft to which the unit is mounted, and the position of the unit lengthwise on the shaft, is not material to the present invention.

The unit includes—in connection therewith, and depending in the main from the mounting plate 1—a spring finger, indicated generally at 10; such spring finger being formed of a single length of spring steel rod and embodying a depending, relatively long tine 11, a loop 12, and a relatively short, upwardly projecting, top portion 13; the tine 11 and portion 13 being tangent to the forward side of the loop.

The loop 12 of the spring finger 10 is disposed adjacent—and opens toward—the flat, laterally facing depending tongue 3, and such loop 12 surrounds a boss 14 in circumferentially free play relation; said boss 14 abutting the depending tongue 3 and having a bore 15 whose inner portion is alined with the bore 6. The outer portion of the bore 15 is enlarged, as at 16, for the purpose as will hereinafter appear.

An L-shaped retainer 17 is disposed with one portion 17a overlying and engaging the outer face of the boss 14, and also overlying the forward portion of the loop 12 and the adjacent end of tine 11. The other front end portion 17b of the retainer extends laterally toward the mounting plate and rests against the forward edge E of the depending tongue thereof, as clearly shown in Fig. 1.

The portion 17a of the retainer 17 which abuts the boss 14 is formed with a square bore 18, and a carriage bolt 19 extends through bores 18, 15, and 6, terminating beyond the back side B of the depending tongue 3. The carriage bolt 19 includes a head 20 which abuts the retainer 17, while the square neck 21 of such bolt matchingly engages in the bore 18.

A nut 22 and a lock washer 23 are engaged on the threaded portion of the carriage bolt 19, being tightened against the back side of the depending tongue 3, whereby to rigidly secure the boss 14 and retainer 17 in place, and to maintain the spring finger loop 12 against escape. The enlarged part of bore 16 is for the purpose of receiving the adjacent end portion of the square neck 21, as shown in Fig. 3.

The upwardly projecting top portion 13 of the spring finger 10 is offset laterally inwardly, and in a form so that it extends through the vertically elongated central slot 7 in the intermediate section 4.

At the immediate upper end thereof the top portion 13 of the spring finger is bent to form a rearwardly projecting hook-tip 24 which bears against the back side B' of the section 4 of the mounting plate 1, as shown in Fig. 3. Said tip 24 is thus disposed in a plane at right angles to the axis of the loop 12. The retainer 17 overlies the adjacent end portions of the tine 11 and portion 13, and—together with the rearwardly projecting tip 24 engaging the back side of the mounting plate—prevents wobbling of the loose fitting loop on the boss. The forward portion 17b of the retainer also protects the loop and limits any possible rebounding movement of the tine 11 when released from a loop-tensioning pressure.

With the above described arrangement, the spring finger 10 is effectively mounted in a manner which permits the depending tine 11 to spring back and forth, with the strain being absorbed through the loop 12 and into the top portion 13; this to the end that the spring finger, in normal use, has a relatively long life, and is less subject to damage or breakage.

Additionally, with the described arrangement the spring finger 10 is normally positively held against escape from the mounting plate 1, but when replacement becomes necessary such finger can be quick-detachably removed by the simple expedient of removing the carriage bolt 19 and then manually disassembling the parts preparatory to remounting with a new spring finger.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A spring unit for a harvester reel comprising a mounting plate having a laterally facing section, a boss on and projecting outwardly from the face of said section, a spring finger having a loop intermediate its ends surrounding the boss, the finger including a tine depending from the forward side of the loop and a top portion upstanding from said side of the loop, a retainer engaging at one end on the outer face of the boss and at the other end overlying the adjacent end portions of the tine and said top portion of the finger, means releasably securing the retainer and boss to the mounting plate, the latter having a vertical slot above the boss through which the upper end portion of said top portion of the finger projects, and a rearwardly projecting tip on the upper end of said top portion engaging the back side of the mounting plate rearwardly of the slot.

2. A spring unit for a harvester reel comprising a mounting plate having a laterally facing section, a boss on and projecting outwardly from the face of said section, a spring finger having a loop intermediate its ends surrounding the boss, the finger including a tine depending from the forward side of the loop and a top portion upstanding from said side of the loop, means releasably securing the upper end of said top portion to the mounting plate, an L-shaped retainer one portion of which engages and overlies the outer face of the boss, the adjacent end portions of the tine and said top portion of the finger and the other portion of the retainer extending laterally to the mounting plate past and adjacent said end portion of the tine and engaging the forward edge of the mounting plate, and means releasably securing the retainer and boss to the mounting plate.

3. A unit, as in claim 2, in which said securing means is a carriage bolt projecting through said one portion of the retainer, the boss and the mounting plate and non-turnably engaging said one portion of the retainer.

References Cited in the file of this patent

UNITED STATES PATENTS

| 171,790 | Galt et al. | Jan. 4, 1876 |
| 184,267 | Sharp | Nov. 14, 1876 |
| 2,707,859 | Walker | May 10, 1955 |

FOREIGN PATENTS

| 4,854 | Norway | Aug. 17, 1896 |
| 585,026 | France | Dec. 1, 1924 |